US012739607B2

(12) United States Patent
Lan et al.

(10) Patent No.: US 12,739,607 B2
(45) Date of Patent: Sep. 15, 2026

(54) USING MORPHOLOGY TO DETERMINE A CONFIDENCE LEVEL OF A CIVIC ADDRESS ASSOCIATED WITH AN ENHANCED 911 CALL

(71) Applicant: T-MOBILE INNOVATIONS LLC, Overland Park, KS (US)

(72) Inventors: Wei-Ming Lan, Morrisville, NC (US); Nan Xiao, Mercer Island, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 390 days.

(21) Appl. No.: 18/220,424

(22) Filed: Jul. 11, 2023

(65) Prior Publication Data

US 2025/0024239 A1 Jan. 16, 2025

(51) Int. Cl.
*H04W 4/90* (2018.01)
*H04W 4/029* (2018.01)

(52) U.S. Cl.
CPC ............ *H04W 4/90* (2018.02); *H04W 4/029* (2018.02)

(58) Field of Classification Search
CPC ......... H04W 4/90; H04W 4/029; H04W 4/02; H04W 4/021; H04W 64/00; H04W 76/50; H04W 4/30; H04W 4/023; H04W 88/02; H04W 4/40; H04W 8/205; H04W 4/20; H04W 4/025; H04W 64/003; H04W 64/006; H04W 4/38; H04W 40/20; H04W 4/18; H04W 4/024; H04W 4/35; H04W 12/63; H04L 67/52; H04L 2101/604; H04L 2101/69; H04L 41/12; H04L 61/35; H04M 3/5116; H04M 3/42357; H04M 2242/04; H04M 2203/558; H04M 2203/559; H04M 2242/30; G06F 16/29; G06F 2221/2111; G06F 16/00; G06F 16/9537; G06Q 50/26; G01S 19/17; G01S 5/0257

See application file for complete search history.

(56) References Cited

U.S. PATENT DOCUMENTS

2016/0027055 A1* 1/2016 Dixon .................. H04L 67/535 705/14.58
2019/0320310 A1* 10/2019 Horelik ................ H04M 3/5116
2022/0011130 A1* 1/2022 Hanniel ............. G01C 21/3602
2022/0182785 A1* 6/2022 Edge ..................... H04W 4/025
2023/0209322 A1* 6/2023 Shrivastava ............ H04W 4/90 455/404.2

* cited by examiner

*Primary Examiner* — Jing Gao
(74) *Attorney, Agent, or Firm* — SHOOK, HARDY & BACON L.L.P.; Elena K. McFarland

(57) ABSTRACT

Systems and methods are provided for using morphology to determine a confidence level of a civic address associated with an enhanced 911 call. After a request by a public safety answer point (PSAP) for a civic address corresponding to user equipment (UE) initiating a call for emergency services is received at a node, the node receives from the UE a geodetic location corresponding to the UE. The geodetic location corresponding to the UE is utilized to retrieve morphology information from a database. Based at least in part on the morphology information, a confidence level of the civic address can be determined. Upon the confidence level of the civic address satisfying a configurable threshold, the civic address is provided to the PSAP.

17 Claims, 3 Drawing Sheets

USING MORPHOLOGY TO DETERMINE A CONFIDENCE LEVEL OF A CIVIC ADDRESS ASSOCIATED WITH AN ENHANCED 911 CALL

SUMMARY

Embodiments of the technology described herein are directed to, among other things, systems and methods for using morphology to determine a confidence level of a civic address associated with an enhanced 911 call. More particularly, morphology information can be retrieved and utilized to determine the accuracy of a reported civic address and assign an appropriate confidence level. To do so, a request by a public safety answer point (PSAP) for a civic address corresponding to user equipment (UE) initiating a call for emergency services is initially received at a node. The node receives from UE a geodetic location and a civic address location corresponding to the UE. The geodetic location corresponding to the UE can be utilized to retrieve morphology information from a database. Based at least in part on the morphology information, a confidence level of the civic address can be determined. Upon the confidence level of the civic address satisfying a configurable threshold, the civic address is provided to the PSAP.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein.

DETAILED DESCRIPTION

Figure 1:
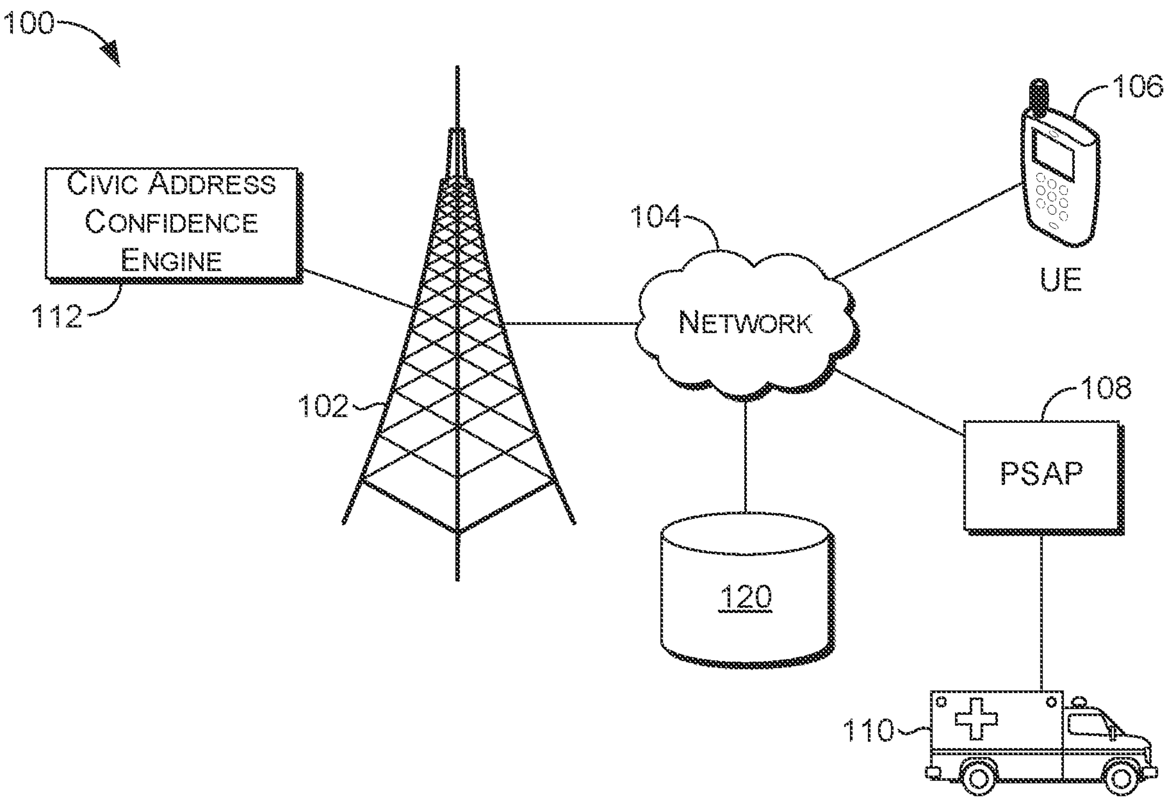
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BRS Broadband Radio Service
CD-ROM Compact Disk Read Only Memory
CDMA Code Division Multiple Access
EIRP Equivalent Isotropically Radiated Power
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit
NEXRAD Next-Generation Radar
NR New Radio
NSA Nonstandalone
OOBE Out-of-Band-Emission
PC Personal Computer
PCS Personal Communications Service
PDA Personal Digital Assistant
RAM Random Access Memory
RAT Radio Access Technology
RET Remote Electrical Tilt
RF Radio-Frequency
RFI Radio-Frequency Interference
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SA Standalone
SINR Signal-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. A definition of such terms can be found in, for example, Newton’s Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

The present disclosure is directed to systems, methods, and computer readable media that systems and methods for using morphology to determine a confidence level of a civic address associated with an enhanced 911 call. More particularly, morphology information can be retrieved and utilized to determine the accuracy of a reported civic address and assign an appropriate confidence level. To do so, a request by a public safety answer point (PSAP) for a civic address corresponding to user equipment (UE) initiating a call for emergency services is initially received at a node. The node also receives from UE a geodetic location corresponding to the UE. The geodetic location corresponding to the UE can be utilized to retrieve morphology information from a database. Based at least in part on the morphology information, a confidence level of the civic address can be determined. Upon the confidence level of the civic address satisfying a configurable threshold, the civic address is provided to the PSAP.

According to aspects of the technology described herein, a method for using morphology to determine a confidence level of a civic address associated with an enhanced 911 call is provided. The method comprises receiving, at a node, a request by a public safety answer point (PSAP) for a civic address corresponding to user equipment (UE) initiating a call for emergency services. The method also comprises receiving from UE, at the node, a geodetic location corresponding to the UE initiating a call for emergency services. The civic address is derived from the geodetic location. The method further comprises utilizing the geodetic location corresponding to the UE, retrieving morphology information from a database. The method also comprises, based at least in part on the morphology information, determining a confidence level of the civic address. The method further comprises upon the confidence level of the civic address satisfying a configurable threshold, providing the civic address to the PSAP.

According to further aspects of the technology described herein, one or more computer-readable media having computer-executable instructions embodied thereon that, when executed by at least one computing device, cause the computing device to perform operations for using morphology to determine a confidence level of a civic address associated with an enhanced 911 call. The operations comprise receiving, at a node, a request by a public safety answer point (PSAP) for a civic address corresponding to user equipment (UE) initiating a call for emergency services. The operations also comprise receiving from UE, at the node, a geodetic location corresponding to the UE initiating a call for emergency services. The civic address is derived from the geodetic location. The operations further comprise utilizing the geodetic location corresponding to the UE, retrieving morphology information from a database. The operations also comprise, based at least in part on the morphology information, determining a confidence level of the civic address.

According to even further aspects of the technology described herein, a system for using morphology to determine a confidence level of a civic address associated with an enhanced 911 call. The system comprises a user equipment (UE) that initiates a call for emergency services. The system also comprises a node configured to: receive a request by a public safety answer point (PSAP) for a civic address corresponding to the UE; receiving from UE a geodetic location corresponding to the UE, wherein the civic address is derived from the geodetic location; utilize the geodetic location corresponding to the UE, retrieving morphology information from a database; determine a confidence level of the civic address, the confidence level based at least in part on the morphology information; and upon the confidence level of the civic address satisfying a configurable threshold, provide the civic address to the PSAP.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 4:
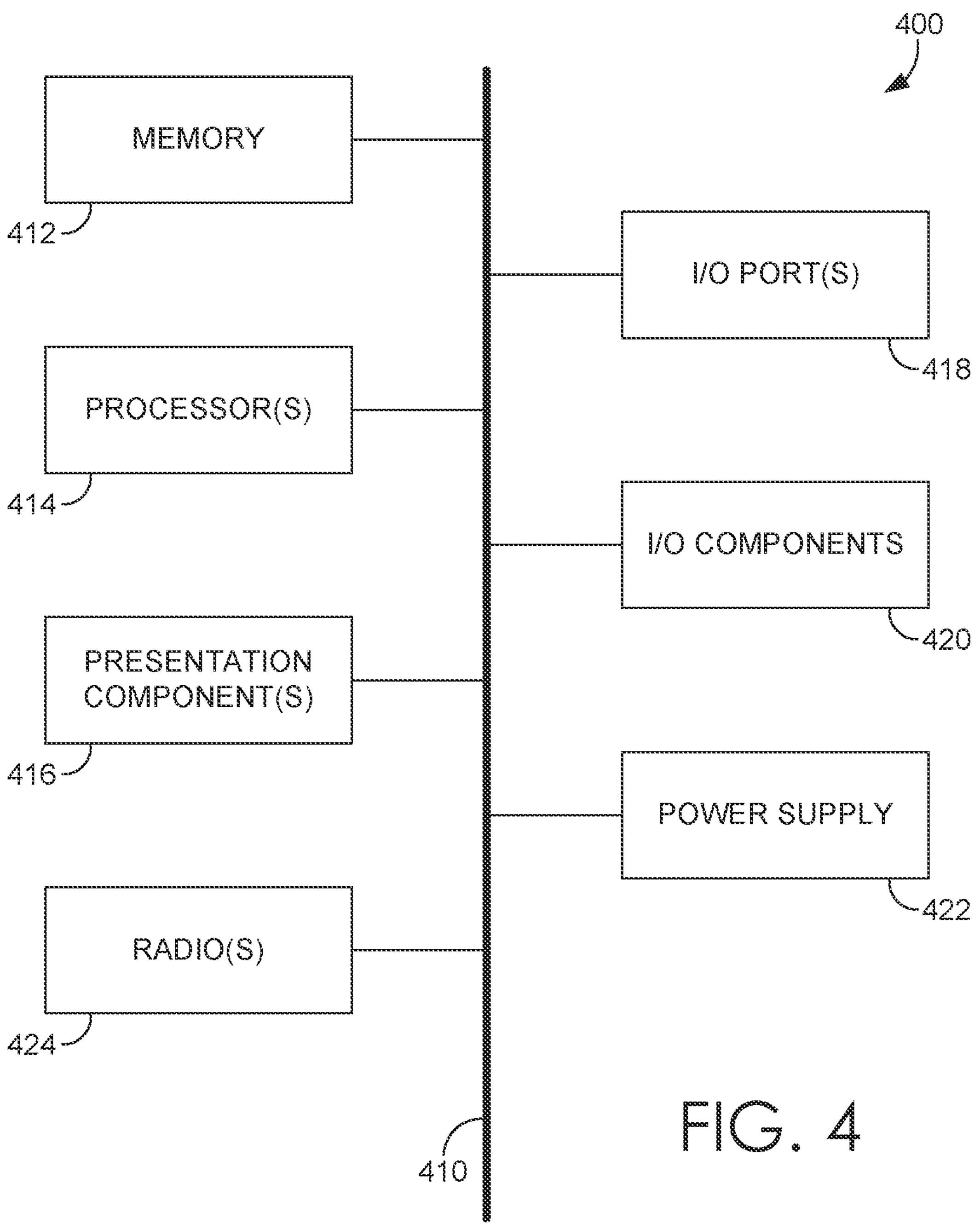
FIG. 4 depicts an example computing environment suitable for use in implementation of the present disclosure.

A network cell may comprise a base station to facilitate wireless communication between a communications device within the network cell, such as communications device 400 described with respect to FIG. 4, and a network. As shown in FIG. 1, a communications device may be a UE 106. In the network environment 100, UE 106 may communicate with other devices, such as mobile devices, servers, etc. The UE 106 may take on a variety of forms, such as a personal computer, a laptop computer, a tablet, a netbook, a mobile phone, a Smart phone, a personal digital assistant, or any other device capable of communicating with other devices. For example, the UE 106 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 106 comprises a wireless or mobile device with which a wireless telecommunication network(s) can be utilized for communication (e.g., voice and/or data communication). In this regard, the UE 106 can be any mobile computing device that communicates by way of, for example, a 5G network.

The UE 106 may utilize network 104 to communicate with other computing devices (e.g., mobile device(s), a server(s), a personal computer(s), etc.). In embodiments, network 104 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 104 may include multiple networks, as well as being a network of networks, but is shown in more simple form so as to not obscure other aspects of the present disclosure. Network 104 may be part of a telecommunications network that connects subscribers to their immediate service provider. In embodiments, network 104 is associated with a telecommunications provider that provides services to user devices, such as UE 106. For example, network 104 may provide voice services to user devices or corresponding users that are registered or subscribed to utilize the services provided by a telecommunications provider. It is contemplated network 104 can be any communication network providing voice and/or data service (s), such as, for example, a 1× circuit voice, a 2G network (e.g. GSM, CDMA), 3G network (e.g., CMDA2000, WCDMA, UMTS), a 4G network (WiMAX, LTE, HSDPA), a 5G network or the like.

The network environment 100 may include a database 120. The database can be any type of medium that is capable of storing information. The database can be any collection of records (e.g., network or device information, a civic address database comprising a mapping of geodetic location to civic address and its corresponding geocoded locations, a parcel database, or a morphology database). In one embodiment, the database includes a set of embodied computer-executable instructions that, when executed, facilitate various aspects disclosed herein. These embodied instructions will variously be referred to as "instructions" or an "application" for short.

As previously mentioned, the UE 106 may communicate with other devices by using a base station, such as base station 102. In embodiments, base station 102 is a wireless communications station that is installed at a fixed location, such as at a radio tower, as illustrated in FIG. 1. The radio tower may be a tall structure designed to support one or more antennas for telecommunications and/or broadcasting. In other embodiments, base station 102 is a mobile base station. The base station 102 may be an MMU and include gNodeB for 5G communications via network 104. In this way, the base station 102 can facilitate wireless communication between UE 106 and network 104.

As stated, the base station 102 may include a radio (not shown) or a remote radio head (RRH) that generally communicates with one or more antennas associated with the base station 102. In this regard, the radio is used to transmit signals or data to an antenna associated with the base station 102 and receive signals or data from the antenna. Communications between the radio and the antenna can occur using any number of physical paths. A physical path, as used herein, refers to a path used for transmitting signals or data. As such, a physical path may be referred to as a radio frequency (RF) path, a coaxial cable path, cable path, or the like.

The antenna is used for telecommunications. Generally, the antenna may be an electrical device that converts electric power into radio waves and converts radio waves into electric power. The antenna is typically positioned at or near the top of the radio tower as illustrated in FIG. 1. Such an installation location, however, is not intended to limit the scope of embodiments of the present invention. The radio associated with the base station 102 may include at least one transceiver configured to receive and transmit signals or data.

In practice, a user of a UE 106 may need emergency services. The user places a call to emergency services (e.g., 911) and the base station 102 facilitates wireless communication between UE 106 and PSAP 108 via the network. In order to dispatch an emergency vehicle 110 to the proper location, PSAP 108 needs the civic address of the UE 106 so the emergency vehicle 110 can provide assistance to the user at that location.

Continuing, the network environment 100 may further include a civic address confidence engine 112. The civic address confidence engine 112 may be configured to, among other things, using morphology to determine a confidence level of a civic address associated with an enhanced 911 call, in accordance with the present disclosure. Though civic address confidence engine 112 is illustrated as a component of network 104 in FIG. 1, it may be a standalone device (e.g., a server having one or more processors), a component of the UE 106, or may be remotely located.

Figure 2:
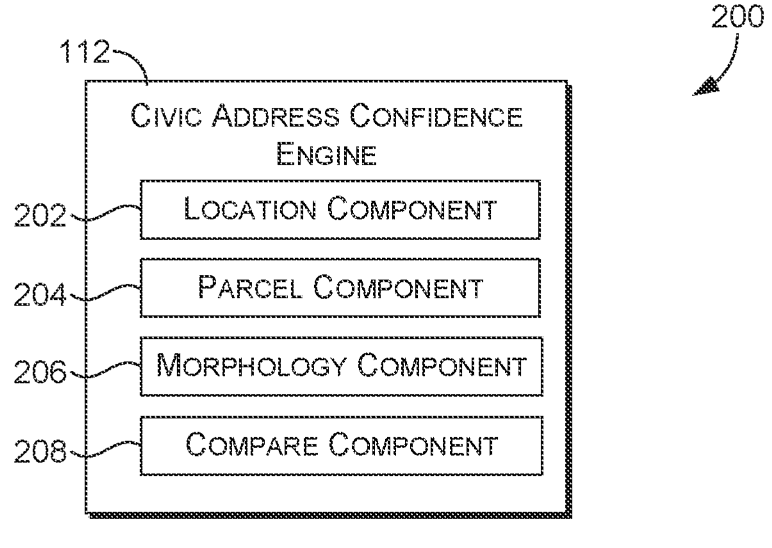
FIG. 2 illustrates a diagram of a civic address confidence engine, in accordance with aspects herein.

Referring now to FIG. 2, the civic address confidence engine 112 may include, among other things, location component 202, parcel component 204, morphology component 206, and compare component 206. The civic address confidence engine 112 may receive, among other things, data from user devices, such as UE 106, or PSAP 108 within a network cell associated with a particular base station 102. Additionally or alternatively, the civic address confidence engine 112 may receive, among other things, data from base station 102, such as data from a gNodeB or eNodeB.

Location component 202 generally receives a request by a PSAP for a civic address corresponding to a UE initiating a call for emergency services. Location component 202 also receives from UE a geodetic location corresponding to the UE. Additionally, the geodetic location is associated with an uncertainty that generally represents the radius of a circular area centered on the geodetic location identified by the node that the actual coordinates of the UE could fall.

In some aspects, location component 202 also determines the civic address and its geocoded location corresponding to the UE. For example, location component 202 may initiate an API call to a reverse geocoder API (e.g., GOOGLE Reverse Geocoding). The API call includes the geodetic location. The reverse geocoder API may be associated with a database mapping geodetic locations to a civic address and its geocoded location and utilizes the geodetic location received as an input to determine the civic address and its geocoded location. Location component 202 receives the civic address and the geocoded location corresponding to the geodetic location as an output of the reverse geocoder API.

Parcel component 204 generally utilizes the geodetic location corresponding to the UE to retrieve parcel information from a database. In some aspects parcel information comprises one or more of: a parcel address, zoning information, land use and vacancy information, structure details, geographic information, and additional items.

Morphology component 206 generally utilizes the geodetic location corresponding to the UE to retrieve morphology information from a database. In some aspects, the database comprising morphology information may be the same database comprising parcel information. In other aspects, the database comprising morphology information may be different than the database comprising parcel information.

Compare component 208 generally, based on a first portion of the parcel information and a comparison of a second portion of the parcel information to the geodetic location and/or the morphology information, determines a confidence level of the civic address. In some aspects the first portion of parcel information comprises one or more of use information (e.g., residential, commercial, single family home, multiple family home, commercial multi-story, mall, free standing retail, etc.), a number of structures, a building count, a number of stories of each building, a list of secondary addresses, or a total address count. In some aspects, the second portion of parcel information comprises: a parcel boundary of a parcel and a structure boundary for each structure located within the parcel.

In some aspects, based on the confidence level of the civic address satisfying a configurable threshold, the civic address is provided to the PSAP. For example, the confidence level of the civic address may satisfy the configurable threshold if the first portion of parcel information indicates the civic address has one structure and one address and the geodetic location is within the structure boundary and/or the morphology information indicates the geodetic location is in a rural/suburban area or an urban area. In some aspects, the confidence may not satisfy the configurable threshold if the morphology information indicates the geodetic location is in a dense urban area even if the first portion of parcel information indicates the civic address has one structure and one address and the geodetic location is within the structure boundary. It should be appreciated the confidence level of the civic address will be highest in a rural/suburban area, next highest in an urban area, and lowest in a dense urban area regardless of what the parcel information indicates.

In another example, the confidence level of the civic address may satisfy the configurable threshold if the first portion of parcel information indicates the civic address has more than one structure or the parcel contains more than one address or the geodetic location is not within the structure boundary but is within the parcel boundary and/or the morphology information indicates the geodetic location is in a rural/suburban area. In some aspects, the confidence may not satisfy the configurable threshold if the morphology information indicates the geodetic location is in an urban area or a dense urban area even if the first portion of parcel information indicates the civic address has more than one structure or the parcel contains more than one address or the geodetic location is not within the structure boundary but is within the parcel boundary.

In contrast, if the confidence level of the civic address does not satisfy a configurable threshold, the civic address is not provided to the PSAP. For example, the confidence level of the civic address may not satisfy the configurable threshold if the first portion of parcel information indicates the geodetic location is not within the parcel boundary and/or the morphology information indicates the geodetic location is in a dense urban area. Other scenarios where the civic address is not provided to the PSAP may include: 1) if county, city, street, and postal code are missing from the parcel information; 2) if the uncertainty and/or distance error are greater than predetermined thresholds (uncertainty refers to an uncertainty that is provided by the UE with the geodetic location and distance error may refer to a distance between the geodetic location and geocoded location); 3) if the distance error is less than predetermined thresholds; or 4) for E911 calls made in markets where parcel information is not available.

If the location of the UE is not in the parcel database (and has no parcel information), the civic address is not reported. If the UE does not provide the civic address, but the location of the UE is in the parcel database, the civic address may still be reported if the morphology information indicates the geodetic location is in a rural/suburban location.

If the geodetic location and the geocoded location are in different parcels, the civic address is not reported. In some aspects, geodetic location and the geocoded location are in different parcels, the civic address from parcel database may still be reported if the morphology information indicates the geodetic location is in a rural/suburban location.

If the geocoded location and the civic address are unrelated, the civic address is not reported. If the location of the UE and the civic address error distance is greater than a configurable threshold, the civic address is not reported. It should be appreciated that the configurable threshold may vary based on the morphology information. For example, in a rural/suburban location, the configurable threshold may be larger (and more lenient) than in an urban location or dense urban location. Similarly, in an urban location, the configurable threshold may be larger (and more lenient) than in a dense urban location.

In a first scenario, if the location of the UE is within an apartment complex, a multi-family complex, or a high-rise building with multiple addresses, the civic address may be reported depending on the morphology information. In some aspects, the civic address may be reported, but with higher confidence than the first scenario, if the morphology information indicates the geodetic location is in a rural/suburban location. In some aspects, the civic address may be reported, with the same or slightly lower confidence than the first scenario and lower than the rural/suburban scenario, if the morphology information indicates the geodetic location is in an urban location. In some aspects, the civic address may be reported, but with lower confidence than the urban scenario (or possibly not reported at all), if the morphology information indicates the geodetic location is in a dense urban location.

In a second scenario, if the location of the UE is within the parcel boundary, but outside the building footprint, the civic address may be reported, but with lower confidence. In some aspects, the civic address may be reported, but with higher confidence than the second scenario, if the morphology information indicates the geodetic location is in a rural/suburban location. In some aspects, the civic address may be reported, with the same or slightly lower confidence than the second scenario and lower than the rural/suburban scenario, if the morphology information indicates the geodetic location is in an urban location. In some aspects, the civic address may be reported, but with lower confidence than the urban scenario (or possibly not reported at all), if the morphology information indicates the geodetic location is in a dense urban location.

In a third scenario, if the location of the UE is within the building footprint, the civic address may be reported, with high confidence. In some aspects, the civic address may be reported, but with higher confidence than the third scenario, if the morphology information indicates the geodetic location is in a rural/suburban location. In some aspects, the civic address may be reported, with the same or slightly lower confidence than the third scenario and lower than the rural/suburban scenario, if the morphology information indicates the geodetic location is in an urban location. In some aspects, the civic address may be reported, but with lower confidence than the urban scenario (or possibly not reported at all), if the morphology information indicates the geodetic location is in a dense urban location.

In a fourth scenario, if the location of the UE is a duplex (where each has its own structure and civic address, but the structure is connected by a wall), the civic address may be reported, with high confidence. In some aspects, the civic address may be reported, but with higher confidence than the fourth scenario, if the morphology information indicates the geodetic location is in a rural/suburban location. In some aspects, the civic address may be reported, with the same or slightly lower confidence than the fourth scenario and lower than the rural/suburban scenario, if the morphology information indicates the geodetic location is in an urban location. In some aspects, the civic address may be reported, but with lower confidence than the urban scenario (or possibly not reported at all), if the morphology information indicates the geodetic location is in a dense urban location.

In a fifth scenario, if the geodetic location is within a strip mall (more than one address in a single structure), the civic address may be reported, but with lower confidence. In some aspects, the civic address may be reported, but with similar confidence as the fifth scenario, if the morphology information indicates the geodetic location is in a rural/suburban location. In some aspects, the civic address may be reported, with the same or slightly lower confidence than the fifth scenario and lower than the rural/suburban scenario, if the morphology information indicates the geodetic location is in an urban location. In some aspects, the civic address may be reported, but with lower confidence than the urban scenario (or possibly not reported at all), if the morphology information indicates the geodetic location is in a dense urban location.

In a sixth scenario, if the location of the UE is within a corporate building (one structure and one civic address), the civic address may be reported with high confidence. In some aspects, the civic address may be reported, but with similar confidence as the sixth scenario, if the morphology information indicates the geodetic location is in a rural/suburban location. In some aspects, the civic address may be reported, with the same or slightly lower confidence than the sixth scenario and lower than the rural/suburban scenario, if the morphology information indicates the geodetic location is in an urban location. In some aspects, the civic address may be reported, but with lower confidence than the urban scenario (or possibly not reported at all), if the morphology information indicates the geodetic location is in a dense urban location.

Figure 3:
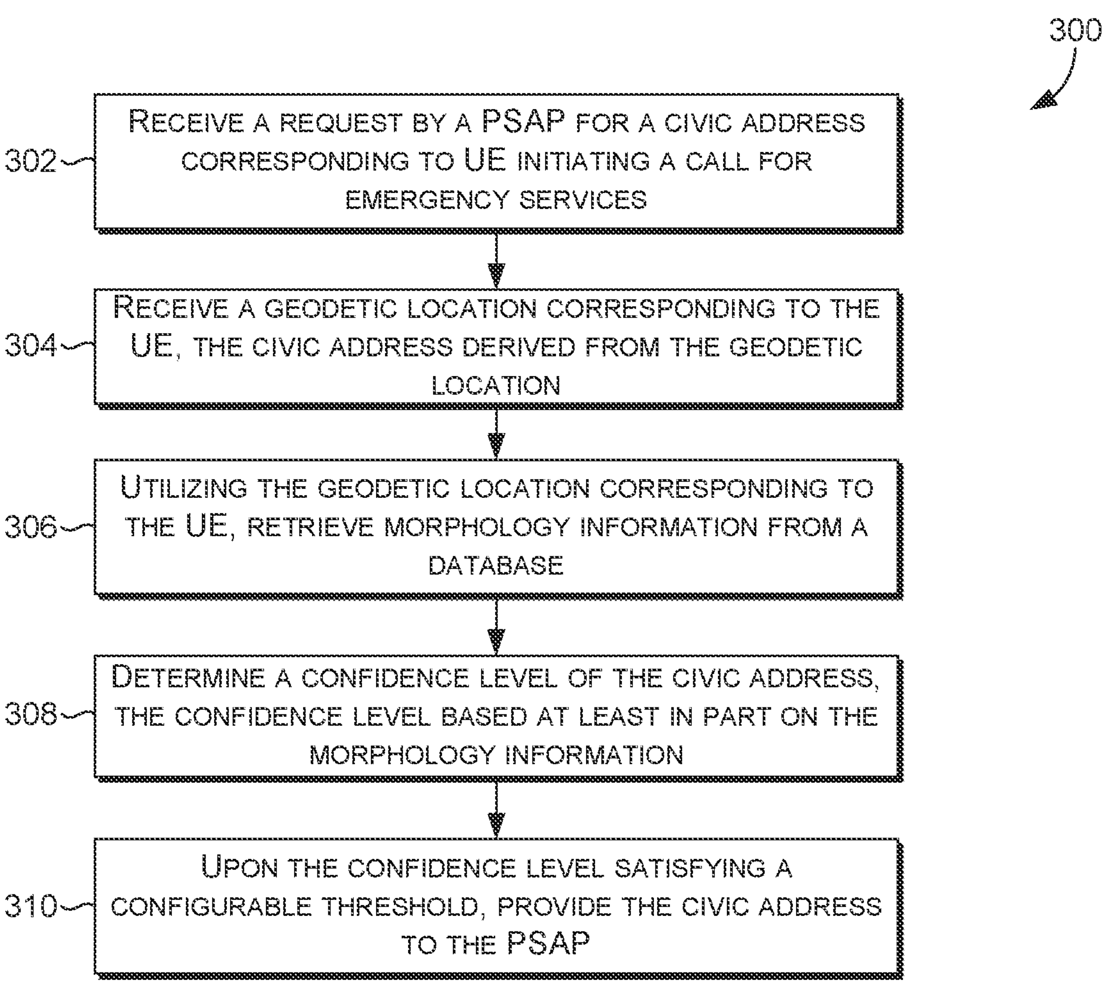
FIG. 3 is a flow diagram of an example method for using morphology to determine a confidence level of a civic address associated with an enhanced 911 call, in accordance with some aspects of the technology described herein.

Referring now to FIG. 3, a flow diagram is provided depicting a method for using morphology to determine a confidence level of a civic address associated with an enhanced 911 call, according to aspects of the technology described herein. Method 300 may be performed by any computing device (such as computing device described with respect to FIG. 4) with access to a scheduling engine (such as the one described with respect to FIG. 2) or by one or more components of the network environment described with respect to FIG. 1 (such as access point 102, UE 106, and/or civic address confidence engine 112). Initially, although not shown by FIG. 5, a user may initiate call for emergency services (e.g., a 911 call). The call is routed to a public safety answer point (PSAP).

At step 302, a request by the PSAP is received, at a node, for a civic address corresponding to UE initiating a call for emergency services. A geodetic location is generated by UE and received by the node, at step 304. For example, the UE may utilize global positioning system (GPS) that leverages the global navigation satellite system (GNSS) network to identify the geodetic location of the UE. Other techniques, such as GOOGLE Fused Location Provider API may be utilized by the UE and provided to the node.

The node utilizes, at step 306, the geodetic location corresponding to the UE to retrieve morphology information from a morphology database. In aspects, the database is a nationwide morphology database that associates each civic address with a morphology type (e.g., rural/suburban, urban, dense urban, and the like).

At step 308, based at least in part on the morphology information, a confidence level of the civic address is determined. At step 310, upon the confidence level of the civic address satisfying a configurable threshold, the civic address is provided to the PSAP. In aspects, the configurable threshold varies based on the morphology information. For example, the configurable threshold in a rural/suburban area is higher (more lenient) than the configurable threshold in an urban area or in a dense urban area. In another example, the configurable threshold in an urban area is lower than the configurable threshold in a rural/suburban area and higher than the configurable threshold in a dense urban area. In yet another example, the configurable threshold in a dense urban area is lower than the configurable threshold in an urban area or in a rural/suburban area.

In some aspects, parcel information is retrieved from a database. The parcel information may comprise one or more of: parcel address, zoning, land use and vacancy information, structure details, geographic information, and additional items. The confidence level of the civic address may further be based in part on a first portion of the parcel information and a comparison of a second portion of the parcel information to the geodetic location. The first portion of parcel information may comprise one or more of: use information, a number of structures, a building count, or a total address count. The second portion of parcel information may comprise a parcel boundary of a parcel and a structure boundary for each structure located within the parcel.

By way of example, the confidence level of the civic address may satisfy the configurable threshold if the first portion of parcel information indicates the civic address has one structure and one address and the geodetic location is within the structure boundary and/or the morphology information indicates the geodetic location is in a rural/suburban area or an urban area.

In another example, the confidence level of the civic address may satisfy the configurable threshold if the first portion of parcel information indicates the civic address has more than one structure or the parcel contains more than one address or the geodetic location is not within the structure boundary but is within the parcel boundary and/or the morphology information indicates the geodetic location is in a rural/suburban area.

In another example, the confidence level of the civic address may not satisfy the configurable threshold if the morphology information indicates the geodetic location is in an urban area or a dense urban area even if the first portion of parcel information indicates the civic address has more than one structure or the parcel contains more than one address or the geodetic location is not within the structure boundary but is within the parcel boundary.

In another example, the confidence level of the civic address may not satisfy the configurable threshold if the first portion of parcel information indicates the geodetic location is not within the parcel boundary or the morphology information indicates the geodetic location is in a dense urban area.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 4, a block diagram of an exemplary computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. It should be noted that although some components in FIG. 4 are shown in the singular, they may be plural. For example, the computing device 400 might include multiple processors or multiple radios. In aspects, the computing device 400 may be a UE/WCD, or other user device, capable of two-way wireless communications with an access point. Some non-limiting examples of the computing device 400 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 410 that directly or indirectly couples various components together, including memory 412, processor(s) 414, presentation component(s) 416 (if applicable), radio(s) 424, input/output (I/O) port(s) 418, input/output (I/O) component(s) 420, and power supply(s) 422. Although the components of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 412 may take the form of memory components described herein. Thus, further elaboration will not be provided here, but it should be noted that memory 412 may include any type of tangible medium that is capable of storing information, such as a database. A database may be any collection of records, data, and/or information. In one embodiment, memory 412 may include a set of embodied computer-executable instructions that, when executed, facilitate various functions or elements disclosed herein. These embodied instructions will variously be referred to as "instructions" or an "application" for short.

Processor 414 may actually be multiple processors that receive instructions and process them accordingly. Presentation component 416 may include a display, a speaker, and/or other components that may present information (e.g., a display, a screen, a lamp (LED), a graphical user interface (GUI), and/or even lighted keyboards) through visual, auditory, and/or other tactile cues.

Radio 424 represents a radio that facilitates communication with a wireless telecommunications network. Illustrative wireless telecommunications technologies include CDMA, GPRS, TDMA, GSM, and the like. Radio 424 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 418 may take a variety of forms. Exemplary I/O ports may include a USB jack, a stereo jack, an infrared port, a firewire port, other proprietary communications ports, and the like. Input/output (I/O) components 420 may comprise keyboards, microphones, speakers, touchscreens, and/or any other item usable to directly or indirectly input data into the computing device 400.

Power supply 422 may include batteries, fuel cells, and/or any other component that may act as a power source to supply power to the computing device 400 or to other network components, including through one or more electrical connections or couplings. Power supply 422 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for using morphology to determine a confidence level of a civic address associated with an enhanced 911 call, the method comprising:

receiving, at a node, a request by a public safety answer point (PSAP) for the civic address corresponding to user equipment (UE) initiating a call for emergency services;

receiving from the UE, at the node, a geodetic location corresponding to the UE, wherein the civic address is derived from the geodetic location;

utilizing the geodetic location corresponding to the UE, retrieving morphology information from a database;

determining a confidence level of the civic address, the confidence level based at least in part on the morphology information, wherein the confidence level of the civic address is further based in part on a first portion of a parcel information and a comparison of a second portion of the parcel information to the geodetic location; and when the confidence level of the civic address satisfies a configurable threshold, providing the civic address to the PSAP, wherein the confidence level of the civic address does not satisfy the configurable threshold when the morphology information indicates the geodetic location is in an urban area or a dense urban area even when the first portion of the parcel information indicates the civic address has more than one structure or a parcel contains more than one address or the geodetic location is not within a structure boundary but is within a parcel boundary.

2. The method of claim 1, wherein the configurable threshold varies based on the morphology information.

3. The method of claim 1, wherein the configurable threshold in a rural/suburban area is higher than the configurable threshold in the urban area or in the dense urban area.

4. The method of claim 1, wherein the configurable threshold in the dense urban area is lower than the configurable threshold in the urban area or in a rural/suburban area.

5. The method of claim 1, further comprising retrieving the parcel information from a database, wherein the parcel information comprises one or more of: parcel address, zoning, land use and vacancy information, structure details, geographic information, and additional items.

6. The method of claim 5, wherein the first portion of parcel information comprises one or more of: use information, a number of structures, a building count, or a total address count.

7. The method of claim 5, wherein the second portion of parcel information comprises the parcel boundary of the parcel and the structure boundary for each structure located within the parcel.

8. The method of claim 5, wherein the confidence level of the civic address satisfies the configurable threshold when the first portion of the parcel information indicates the civic address has one structure and one address and the geodetic location is within the structure boundary or the morphology information indicates the geodetic location is in a rural/suburban area or the urban area.

9. The method of claim 5, wherein the confidence level of the civic address satisfies the configurable threshold when the first portion of the parcel information indicates the civic address has more than one structure or the parcel contains more than one address or the geodetic location is not within the structure boundary but is within the parcel boundary and/or the morphology information indicates the geodetic location is in a rural/suburban area.

10. The method of claim 5, wherein the confidence level of the civic address does not satisfy the configurable threshold when the first portion of the parcel information indicates the geodetic location is not within the parcel boundary or the morphology information indicates the geodetic location is in the dense urban area.

11. One or more non-transitory computer-readable media having computer-executable instructions embodied thereon that, when executed by at least one computing device, cause the computing device to perform operations for using morphology to determine a confidence level of a civic address associated with an enhanced 911 call, the operations comprising:

receiving, at a node, a request by a public safety answer point (PSAP) for the civic address corresponding to user equipment (UE) initiating a call for emergency services;

receiving from the UE, at the node, a geodetic location corresponding to the UE, wherein the civic address is derived from the geodetic location;

utilizing the geodetic location corresponding to the UE, retrieving morphology information from a database;

determining a confidence level of the civic address, the confidence level based at least in part on the morphology information, wherein the confidence level of the civic address is further based in part on a first portion of a parcel information and a comparison of a second portion of the parcel information to the geodetic location; and when the confidence level of the civic address satisfies a configurable threshold, providing the civic address to the PSAP, wherein the confidence level of the civic address does not satisfy the configurable threshold when the morphology information indicates the geodetic location is in an urban area or a dense urban area even when the first portion of the parcel information indicates the civic address has more than one structure or a parcel contains more than one address or the geodetic location is not within a structure boundary but is within a parcel boundary.

12. The one or more non-transitory computer-readable media of claim 11, wherein the configurable threshold varies based on the morphology information.

13. The one or more non-transitory computer-readable media of claim 11, wherein the configurable threshold in a rural/suburban area is higher than the configurable threshold in the urban area or in the dense urban area.

14. The one or more non-transitory computer-readable media of claim 11, wherein the configurable threshold in the dense urban area is lower than the configurable threshold in the urban area or in a rural/suburban area.

15. A system for using morphology to determine a confidence level of a civic address associated with an enhanced 911 call, the system comprising:

a user equipment (UE) that initiates a call for emergency services; and a node configured to:

receive a request by a public safety answer point (PSAP) for the civic address corresponding to the UE;

receive from the UE, a geodetic location corresponding to the UE, wherein the civic address is derived from the geodetic location;

utilizing the geodetic location corresponding to the UE, retrieve morphology information from a database;

determine a confidence level of the civic address, the confidence level based at least in part on the morphology information, wherein the confidence level of the civic address is further based in part on a first portion of a parcel information and a comparison of a second portion of the parcel information to the geodetic location; and when the confidence level of the civic address does not satisfy a configurable threshold, not providing the civic address to the PSAP, wherein the confidence level of the civic address does not satisfy the configurable threshold when the morphology information indicates the geodetic location is in an urban area or a dense urban area even when the first portion of the parcel information indicates the civic address has more than one structure or a parcel contains more than one address or the geodetic location is not within a structure boundary but is within a parcel boundary.

16. The system of claim 15, further comprising retrieving the parcel information from a database, wherein the parcel information comprises one or more of: parcel address, zoning, land use and vacancy information, structure details, geographic information, and additional items.

17. The system of claim 15, wherein the configurable threshold in a rural/suburban area is higher than the configurable threshold in the urban area or in the dense urban area.

* * * * *